United States Patent [19]

Sigmund

[11] Patent Number: 4,507,860

[45] Date of Patent: Apr. 2, 1985

[54] PRODUCTION LINE FOR GRAPHITE NIPPLES

[75] Inventor: Adolf Sigmund, Meitingen, Fed. Rep. of Germany

[73] Assignee: Sigri Elektrographit GmbH, Meitingen bei Augsburg, Fed. Rep. of Germany

[21] Appl. No.: 446,252

[22] Filed: Dec. 2, 1982

[30] Foreign Application Priority Data

Dec. 3, 1981 [DE] Fed. Rep. of Germany ....... 3147793

[51] Int. Cl.³ ............................................ H01R 43/00
[52] U.S. Cl. ...................................... 29/825; 408/45
[58] Field of Search ................. 198/345; 29/825, 428, 29/430, 402.16, 402.17, 402.18, 564.7, 564.8; 408/42, 45

[56] References Cited

U.S. PATENT DOCUMENTS

| | | | |
|---|---|---|---|
| 3,084,419 | 4/1963 | Doetsch et al. | 29/825 |
| 3,550,270 | 12/1970 | Watson, Jr. et al. | 29/825 |
| 3,618,204 | 11/1971 | La Valle | 29/593 |
| 3,761,191 | 9/1973 | Frazier | 408/45 X |

Primary Examiner—Howard N. Goldberg
Assistant Examiner—Carl J. Arbes
Attorney, Agent, or Firm—Herbert L. Lerner; Laurence A. Greenberg

[57] ABSTRACT

Manufacture of tapered thread nipples of cylindrical graphite sections in a production line with a rotary-cycle machine with stations and a turntable rotated at a predetermined period to move from one station to another. Prismatic guides radially connected to turntable to receive sections. A boring mill above the second station for drilling blind holes into the sections. Filing nozzles above the third station for filling the blind holes with binder. A tie-rod to remove the section from the fourth station. A turning machine for cutting free the binder filled holes.

10 Claims, 4 Drawing Figures

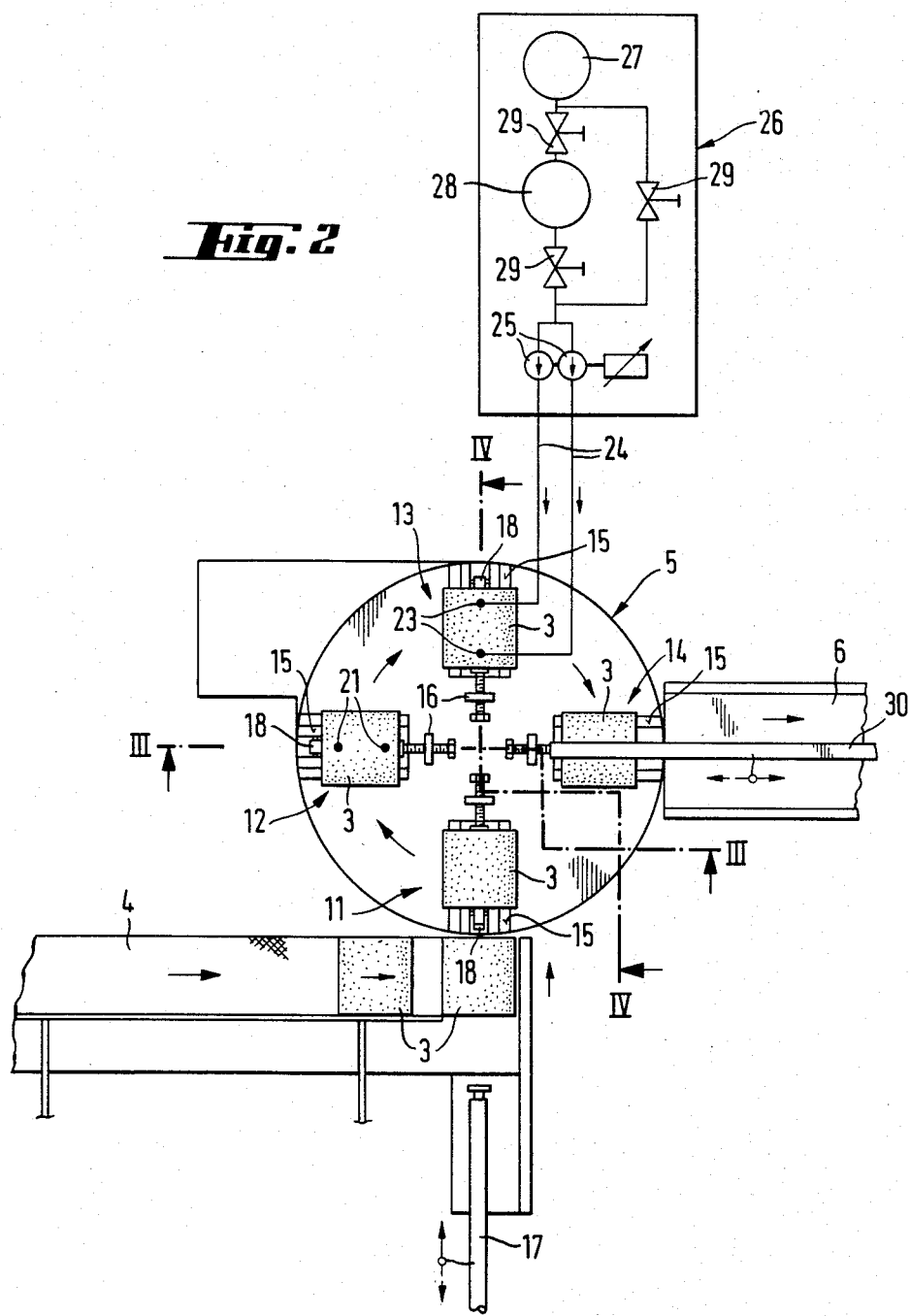

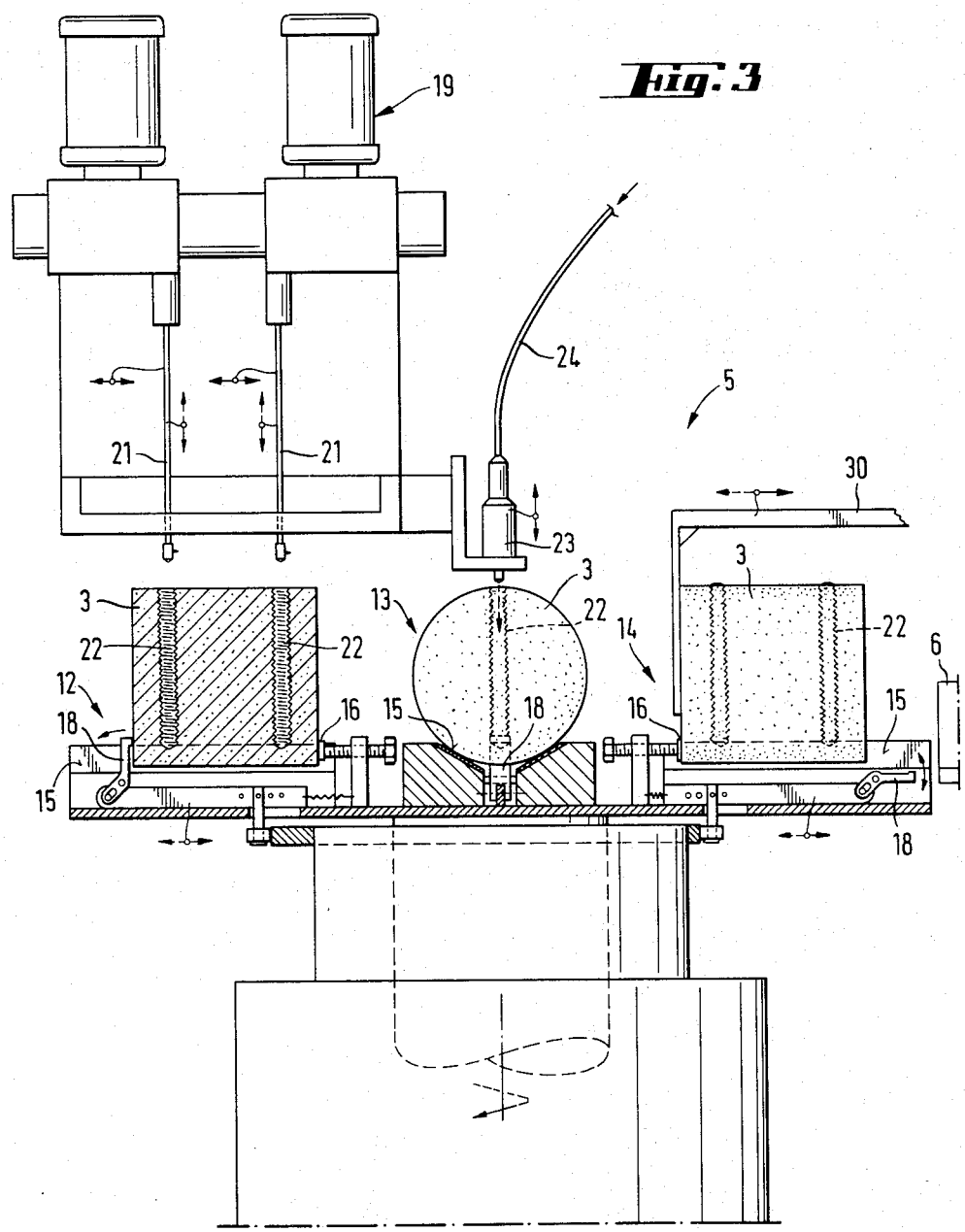

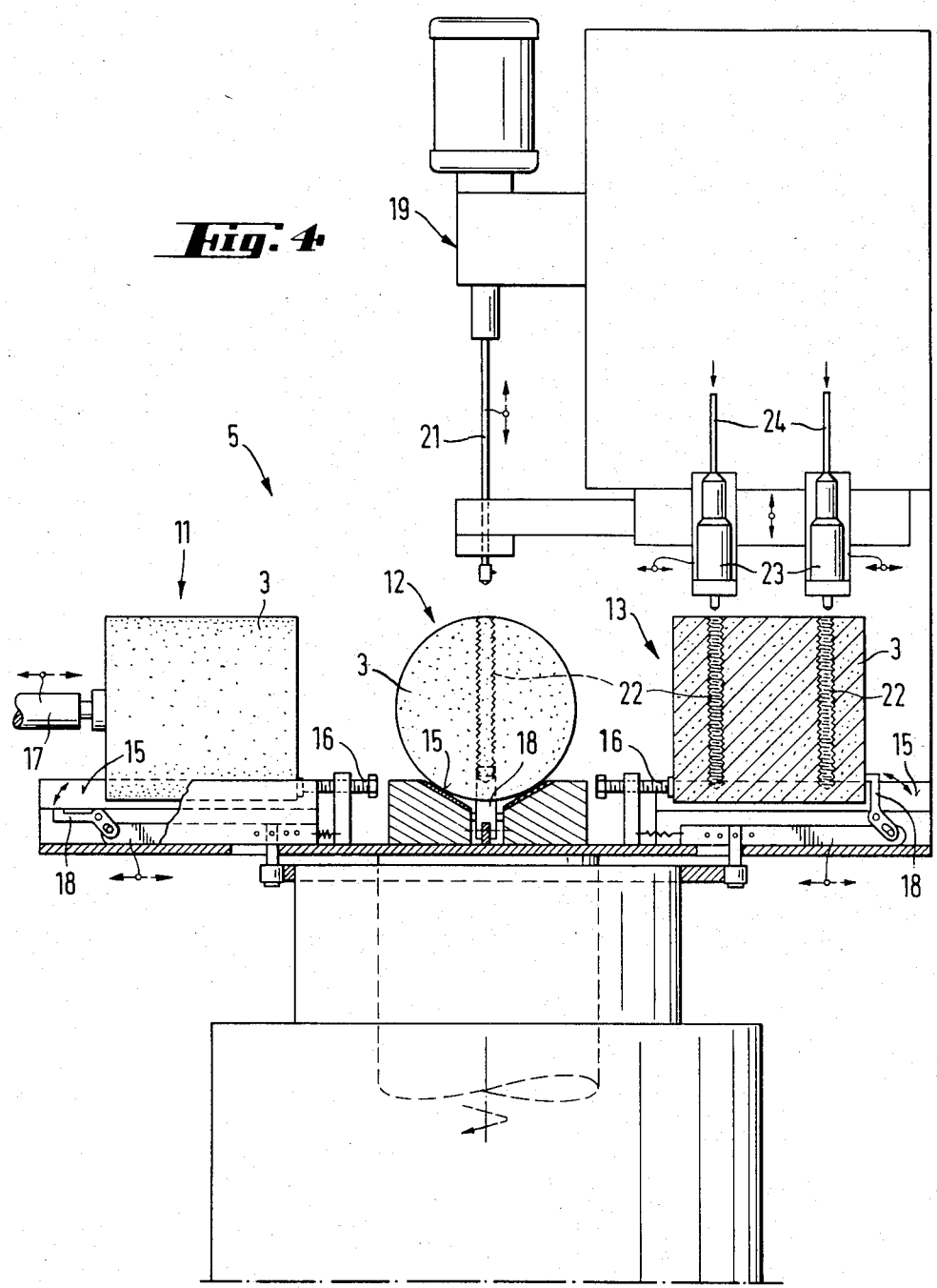

PRODUCTION LINE FOR GRAPHITE NIPPLES

BACKGROUND OF THE INVENTION

1. Field of the Invention

The invention relates to a production line for manufacturing tapered thread nipples of cylindrical graphite sections, through which the graphite sections are moved, cut to length, faced off, provided with storage holes for receiving a thermoplastic binder and with a screw thread, and the storage holes filled with the thermoplastic binder.

2. Description of the Prior Art

Graphite electrodes used in arc furnaces, for instance, for producing electric-furnace steel, consist of several cylindrical graphite sections screwed together. In the operation of the electrodes, the lowest section which forms a base for the arc, is gradually consumed, so that the entire line of electrodes must be lowered proportionally to the consumption rate and a new section must be put in place from time to time at the head of the line. The individual sections are generally screwed together with thread nipples which engage with a recess or socket at the end faces of the sections. The joints of the electrode sections are critical points of the electrode line, since the screw joint can be loosened by the various forces acting on the joint, and also fractures can occur. Loosening results in a higher contact resistance and larger temperature gradients in the electrode line, which eventually also cause a fracture of the connection. Since parts of the electrode line crashing into the hearth of the furnace increase the specific consumption of the electrode and lead to disturbances in the furnace operation, there has been no lack of attempts to improve the strength of the joints in an electrode line and to provide a permanent connection between the parts of an electrode line.

Permanent joints consist frequently of coke bridges which are formed between the surfaces of the socket and the nipple or between the abutting faces of the electrode sections. Such coke bridges are made by providing the nipples or electrode sections with one or several storage spaces which are in connection with the surface of these parts, and the storage spaces are filled with a carbonizible binder which melts or softens at elevated temperature. Preferably, thermosplastic binders are used, for instance bituminous coal tar pitch. If the temperature of the electrode when inserted into an arc furnace, rises above the softening point of the binder, part of the binder flows out of the storage space and fills, at least partially, the empty space between the threads of the joint or the electrode sections. With further rising temperature, the binder is pyrolized and temperature-resistant coke bridges are formed. Greatly different arrangements and designs of the storage spaces have become known, for instance, storage spaces which are worked into the socket or the nipple end face and are filled with pitch, from U.S. Pat. No. 2,510,230, or the storage spaces in the end faces of the electrode sections from U.S. Pat. No. 2,894,776. In these designs the permanent joint extends not at all or only slightly to the screw thread which is included as a cementing surface in an embodiment of U.S. Pat. No. 2,510,230 and according to the teachings of U.S. Pat. No. 2,836,294. The storage spaces arranged in the storage rooms consist here of cylindrical canals or holes which extend essentially transversely to the longitudinal axis of the nipple. Two methods have become known for filling these storage spaces: (1) The storage space is cast full of the melted binder. (2) Preformed bodies consisting of the binder are inserted into the storage space (U.S. Pat. No. 2,836,294). The first-mentioned method is particularly simple, since no forming tools are required and the liquid binder adapts itself to any storage shape. It is merely necessary to heat the binder, prior to pouring, to a temperature of about 30° to 80° C. above its softening point. On the other hand, the vapor developed by hot binders, for instance pitch, which may contain substances harmful to health, are a disadvantage.

SUMMARY OF THE INVENTION

It is therefore an object of the invention to provide for the manufacture of cylindrical storage spaces in the nipples and the filling of the storage spaces with a thermoplastic binder as stations of an automatic production line for nipples, in which graphite sections are cut to length, the cut-to-length sections are machined into double-cones and screw threads are milled into the cone surfaces. Damage or pollution of the environment by binder vapors is to be precluded here and the binder filling of the storage spaces should adhere in such a manner that the binder which is brittle at room temperature does not break out of the storage spaces during the processing stages following the filling process.

With the foregoing and other objects in view, there is provided in accordance with the invention a production line for manufacturing tapered thread nipples of cylindrical graphite sections, through which the graphite sections are moved, including cutting means for cutting to length a graphite rod to cylindrical graphite sections, means for face off the graphite sections, drilling means to form storage holes in the graphite sections, threading means for forming a screw thread in the surface of the graphite section, and thermoplastic binder means for filling the storage holes with thermoplastic binder, the combination therewith of a rotary-cycle machine with a plurality of stations and a turntable which can be rotated at a predetermined period to move from one station to another station, prismatic guides radially connected to the turntable for receiving the graphite sections and respective stops movable in the radial direction, a push rod associated with a first said station, the rod periodically acting in the radial direction to transfer a graphite section onto the prismatic guide at the first station, clamping levers linked to the turntable to act on graphite sections supported in the prismatic guides in a region of a second said station and a third said station, a boring mill arranged above the second station, the boring mill having at least two drilling spindles which can be moved relative to one another and can be moved in a vertical direction for drilling blind holes into the graphite sections, at least two filling nozzles are arranged above the third station and can be moved relative to each other and in a vertical direction for filling the blind holes with the binder, the nozzles connected by heatable pipe lines, via a control dosing pump each, to a heatable binder supply tank, a tie rod which periodically engages with a fourth said station and is moved in the radial direction to remove the graphite section from the prismatic guide at the fourth station of the turntable, a turning machine arranged in the production line after removal of the graphite section from the turntable for cutting free the binder filled holes.

Other features which are considered as characteristic for the invention are set forth in the appended claims.

Although the invention is illustrated and described herein as embodied in a production line for graphite nipples with devices for making storage holes and for filling the holes with a binder, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which:

FIG. 2 is a top view of the turn table, FIG. 3 is a cross section taken along line III—III in FIG. 2 and FIG. 4 is a cross section taken along line IV—IV in FIG. 2.

DETAILED DESCRIPTION OF THE INVENTION

Figure 1:
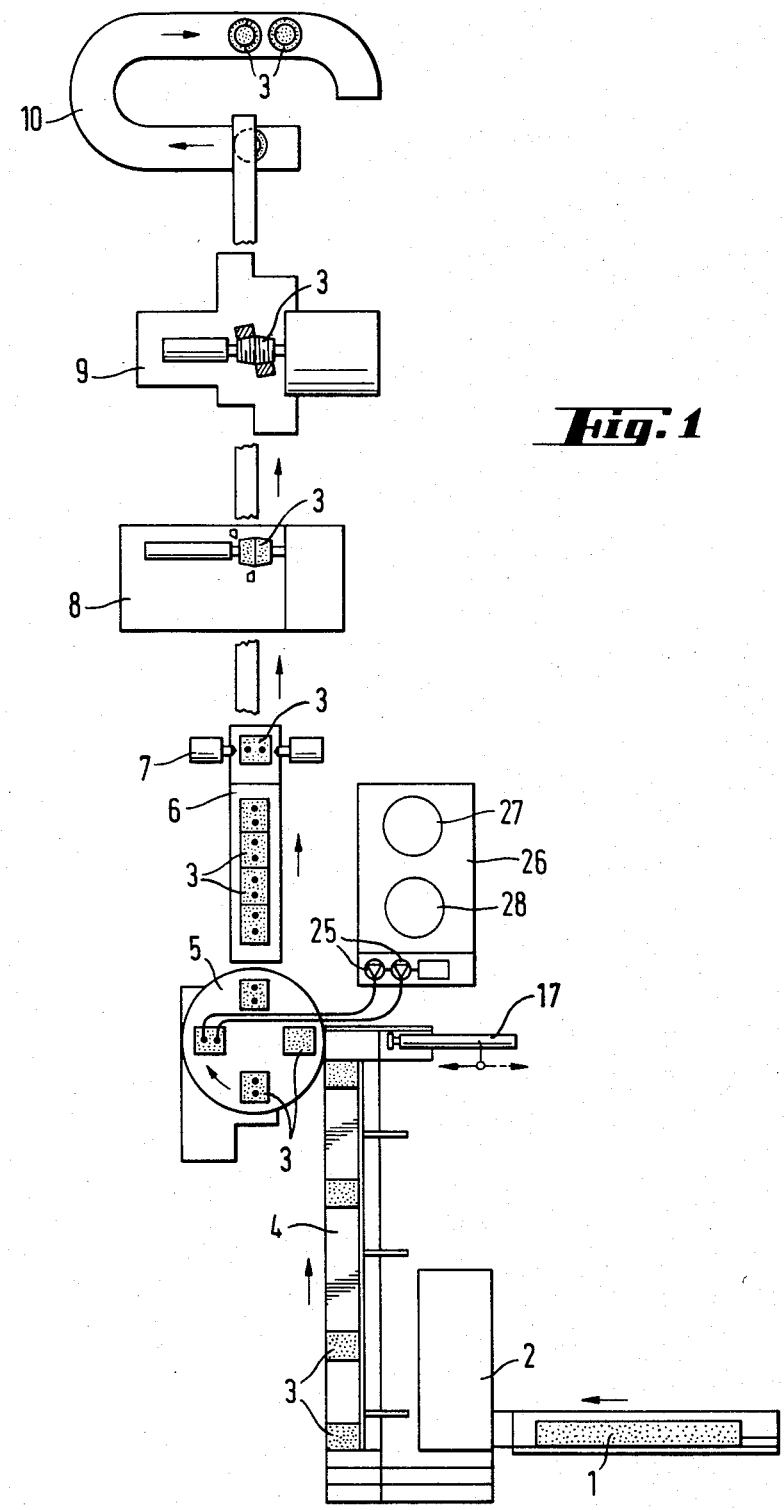
FIG. 1 is a schematic illustration of the production line for manufacturing double-cone nipples.

In accordance with the invention the production line of the type mentioned at the outset is provided with a rotary-cycle machine with stations 11, 12, 13 and 14 and a turntable 5 rotatable with a predetermined period. Four prismatic guides 15 are rigidly connected to the turntable for receiving the graphite sections, and which are limited each by an adjustable stop 16 in the radial direction. A push rod 17 associated with station 11 acts periodically in the radial direction. Four clamping levers 18 which are linked to the turntable act on the graphite sections supported in the regions 12 and 13. A boring mill 19 which is arranged above station 12, has at least two spindles 21 which can be moved relative to each other and can be displaced in the vertical direction for drilling blind holes 22 into the graphite sections. At least two filling nozzles 23 which are arranged above station 13, are connected by heatable pipe lines 24 via a controlled dosing pump 25 each to a binder supply tank 26, and are movable in the vertical direction, for filling the blind holes with the binder. A tie rod 30 engages periodically with the station 14 and is moved in the radial direction. A turning machine 8 is arranged after the turntable in the production direction for cutting free the binder-filled blind holes.

The graphite rod 1 which is moved by a transport system, for instance a chain belt, not shown in the drawing, toward the production line is cut by means of the saw 2 into sections 3. The graphite rod sections are moved on the conveyor belt 4 toward the turntable 5, are secured on the table and provided with blind drill holes. After the holes are filled with a binder, the graphite sections 3 are transported on the roller tracks 6, designed as a cooling section, to the centering station 7, provided with centers, and turned conically on the turning machine 8. On the milling machine 9, the graphite sections are provided with a screw thread and then transported on the plate belt 10 to an inspection station, not shown in the drawing. The movable parts of the production line are linked together in known manner, and the operating cycles of the individual stations are matched to each other.

The rotary-cycle machine has stations 11, 12, 13 and 14 and a turntable 5 (FIGS. 2-4) which can rotate about a vertical axis in steps of 90° with four prismatic guides 15 each of which is provided with a stop 16 which can be adjusted in the radial direction. The push rod 17 is associated with the station 11 by means of which graphite sections 3 are periodically pushed by the belt 4 on the guide 15 and against the stop 16. The pushrod 17 returns into the starting position and at the same time the turntable rotates 90°, putting the graphite section into the position 12. During the rotation, the clamping lever 18 linked to the turntable is pressed via a cam, not shown in the drawing, against the end face of the graphite section which is thereby firmly secured. The boring mill 19 with the spindles 21 is arranged above the station 12. The boring mill 19 is movable in the vertical direction, and the drilling spindles 21 move relative to each other. The purpose of the boring mill is to provide storage spaces extending substantially transversely to the longitudinal axis of the graphite section 3 for receiving a binder. Since most binders, for instance, pitch binders do not wet graphite at room temperature, holes with a smooth wall do not serve best as a storage device. Therefore, the drilling spindles have a tooth-like extension for producing a suitable surface structure. In drilling with a feed of about 2 mm/revolution, a depressed spiral is obtained on the cylinder surface of the cylinder 3, which cylinder surface forms an excellent anchoring background for the binder. The drilling dust remaining in the hole also interferes with the adhesion of the binder. The drill holes 22 are therefore blown out, advantageously with a compressed gas, for instance compressed air, which is fed advantageously via the drill itself. In another embodiment, the boring mill is stopped before the spindles are pulled out. Damage to the spiral depression of the bore hole surface is prevented thereby, and only a substantially vertical groove is formed in pulling.

After the blind holes 22 are completed and the drilling spindle 21 is removed from the holes, the turntable 5 is rotated clockwise by another 90° and the graphite section 3 gets into the position 13. Two filling nozzles 23 which are movable in the vertical direction and relative to each other are arranged above station 13. The filling nozzles 13 are connected, each via a flexible, thermally insulated and heatable pipe line 24 and a dosing pump 25 to the heatable binder supply tank 26. The supply tank has one part 27, in which the binder is melted and another part 28 in which the melted binder is maintained at the desired temperature. Valves 29 are arranged in known manner between the parts 27 and 28 of the supply tank 26 and the dosing pumps 25.

Bituminous coal tar pitches with a softening point of about 80° to 100° C., which when heated result in a coking residue as large as possible are particularly suitable as binder. Such pitches contain major portions of coagulating, high-molecular resins, which are deposited in the dosing pumps and can impair their operability. This fault has advserse effects in the intermittent operation of the pumps, particularly when small quantities are dosed. According to a preferred embodiment of the invention, piston pumps without valves are therefore provided as dosing pumps, the operation of which is not disturbed by resin components in the pitch. The volume of the blind drillholes is a function of the diameter of the graphite section and is about 10 to 200 cm$^3$. The corresponding output of the pump is advantageously controlled by changing the speed and the stroke. The filled-in quantity of pitch in the hole 22 shrinks upon cooling-down to such an extent, that a funnel-shaped void is formed underneath the opening of the hole. The missing amount of binder is added, at least in part, by replenishment shortly before the end of the cycle according to a preferred embodiment of the invention. The quantity to be replenished is a function of the total quantity of binder and is adjusted, as described above, by changing the speed of the dosing pump 25.

After the holes 22 are filled with a binder, the turntable 5 is rotated clockwise by another 90° and the graphite section 3 is put in the position 14. In this rotation, the clamping lever 18 flips downward and releases the graphite section which is pulled from the station 14 onto the roller track 6 by means of the periodically engaging tie rod 30. The turntable 5 after a further rotation by 90° clockwise, resumes the starting position 11 and the cycle starts anew.

The stop 16, the drilling spindles 21, and the filling nozzles 23 are movably arranged to adapt to different diameters and lengths of graphite sections. The production line is started up after these parameters and the dosing and replenishing quantity of the dosing pumps 25 are set. Since the graphite sections 3 have an out of round or a more or less elliptical cross section and a wavy cylinder surface, due to the preceding pyrolysis and graphitizing, the guidance and securing of the sections are particularly important. The prismatic guides provided in accordance with the invention and the clamping means make possible an unambiguous and lasting fixation of the graphite sections during the drilling and filling operations. Securing the sections by the clamping lever 18 and the division accuracy of the turntable 5 ensure in particular that the filling nozzles 23 are positioned exactly above the center of the bind holes 22 and thereby, troublefree filling of the storage spaces is made possible. By the special design of the drills used for drilling the blind holes 22, the hole surface is structured such that the binder filling does not drop out of the holes in spite of the poor adhesion of this material. The pitch used as a rule as the binder exhibits some material properties which make any automatic dosing more difficult, for instance, the great changes of the viscosity with temperature and the coagulation of the high-molecular resin components and, finally, the heavy shrinkage upon solidification. The difficulties due to the material are corrected by dosing the binder with valveless dosing pumps and redosing at the end of the cycle time.

The storage holes filled with binder of the graphite sections 3 removed from the turntable 5 are accessible only from one side. The second access is provided on the turning machine 8, on which the graphite sections are turned conically and the blind holes 22 are cut free in the process. If the nipple is heated, for instance, when used as a connecting element in an electrode line, the binder emerges accordingly at two opposite points of a nipple, flows into the empty spaces of the thread and finally forms a solid and uniform joint between the nipple and the electrode socket.

There are claimed:

1. Production line for manufacturing tapered thread nipples of cylindrical graphite sections, through which the graphite sections are moved, comprising a support means, cutting means located on said support means for cutting to length a graphite rod into cylindrical graphite sections, means on said support means located downstream from said cutting means, for facing off a curved surface layer of each of the graphite sections for cutting free binder filled holes, drilling means located on said support means and downstream from said facing off means to form storage holes in the graphite section, thermoplastic binder means located on said support means and operatively connected to said storage holes for filling the storage holes with thermoplastic binder, and threading means located downstream from said thermoplastic binder means for forming a screw thread in the surface of the graphite section, in combination with a rotary-cycle machine located on said support and having a plurality of stations and a turntable rotatable at a predetermined rate movable from one station to another station, prismatic guides radially connected to the turntable for receiving the graphite sections and respective stops movable in the radial direction of said turntable, a push rod located on said support means and operatively associated with a first station of said rotary-cycle machine, said rod periodically acting in the radial direction of said machine to transfer a graphite section onto one of the prismatic guides at the first station, clamping levers linked to the turntable to act on graphite sections supported in the prismatic guides in a region of a second station and a third station of said machine, a boring mill supported on said support means and operatively associated with the second station, said boring mill having at least two drilling spindles which can be moved relative to one another and can be moved in a vertical direction for drilling blind holes into the graphite sections, at least two filling nozzles supported on said support means and located above a third station of said machine, movable relative to each other and in a vertical direction for filling the blind holes with the binder each of said nozzles being connectable to a heatable pipe line with said pipe line being controllable by a control dosing pump with said dosing pump being operatively associated with a heatable binder supply tank, a tie rod supported on said support means and operatively associated with a fourth station of said machine which periodically engages said fourth and is movable in the radial direction of said machine to remove the graphite section from the prismatic guide at the fourth station of the turntable, a turning means supported on support means operatively associated with said machine and located in the production line after removal of the graphite section from the turntable for cutting free the binder filled holes.

2. Production line according to claim 1, wherein the drilling spindles have a tooth-like cutting edge.

3. Production line according to claim 1, wherein the drilling spindles are tubular and are connected to a compressed-gas supply.

4. Production line according to claim 2, wherein the drilling spindles are tubular and are connected to a compressed-gas supply.

5. Production line according to claim 1, wherein the dosing pumps are piston pumps without valves.

6. Production line according to claim 3, wherein the dosing pumps are piston pumps without valves.

7. Production line according to claim 1 including means operatively associated with the spindles and is used for stopping the spindles and then drawing the spindles out of the blind holes.

8. Production line according to claim 2, including means operatively associated with the spindles and is used for stopping the spindles and then drawing the spindles out of the blind holes.

9. Production line according to claim 7, including means operatively associated with the graphite sections and is used for filling the blind holes with binder and, after the latter has cooled down, replenishing any shrinkage loss.

10. Production line according to claim 8, including means operatively associated with the graphite sections and is used for filling the blind holes with binder and, after the latter has cooled down, replenishing any shrinkage loss.

* * * * *